3,328,587
PHOTOELECTRIC APPARATUS FOR CONTINUOUSLY MONITORING THE QUALITY OF A FLOWING PARTICULATE MATERIAL IN RESPECT OF ITS GRANULARITY AND PURITY

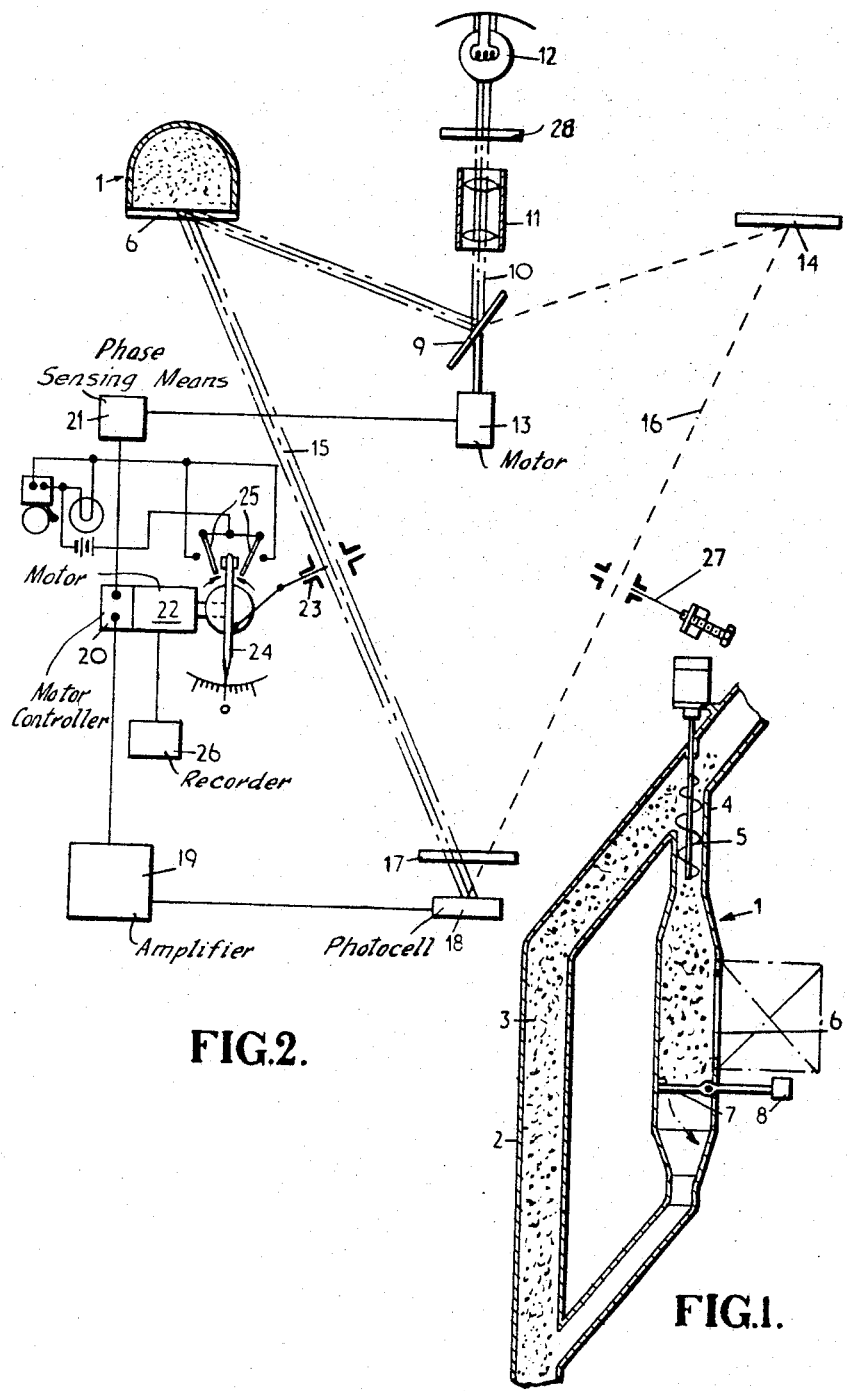

Thomas J. A. Brown, Buxton, and Harry Gordon, Heaton Chapel, Stockport, England, assignors to Henry Simon Limited, Cheshire, England, a British company
Filed Mar. 25, 1963, Ser. No. 267,646
Claims priority, application Great Britain, Mar. 28, 1962, 11,833/62
10 Claims. (Cl. 250—218)

This invention relates to the automatic continuous monitoring of the quality of flowing particulate materials in respect of their granularity and purity and especially to the continuous monitoring of the quality of substantially white materials such as wheat flour, starch, salt, hydrated lime and the like.

It is known to assess the purity of certain insoluble materials of the kind referred to, by mixing a sample of a material with distilled water in prescribed proportions, to form a smooth homogeneous paste which is poured into a transparently walled cell that is placed in the path of a parallel beam of light in such a way that light reflected from the paste passes through a filter and activates a photocell, there being also a second photocell which in a similar manner and through a similar filter receives, from the same light source, a beam of light which has either been reflected from a surface of known colour characteristics, or has otherwise been modified to provide a constant "standard" value, the electrical outputs from the two photocells, being measured by an electrical bridge arranged to express differences in electrical characteristics in terms indicating differences in the characteristics of the reflected beams of light, and consequently affording a measure of the relative purity of the sample under test as compared with the predetermined standard.

It is a disadvantage of this method of assessment that the processes involved are not readily applicable to the continuous automatic monitoring of the quality of dry flowing material, and it is also a disadvantage of the method that the testing of the material in the form of a paste makes it impossible to assess the magnitude of any changes occurring in the granularity of such material. It is a further disadvantage of the method that the means for making a comparison involves the use of two photocells which are, and must remain, functionally identical.

The object of this invention is to provide a means which is free from these disadvantages.

According to this invention apparatus for the automatic continuous monitoring of the quality of flowing dry particulate material, comprises a sample holder wherein a continuously collected part of a flowing stream of particulate material is to be received and consolidated in such manner that it passes by a transparent section of the sample holder in the form of a continuously moving column having a predetermined substantially uniform density, a reflecting surface of a colour approved as a standard of comparison, a light source arranged to project a beam of light onto a beam deflecting means arranged to cause the beam to fall alternately on the "standard" surface and on the material in the sample holder, a photocell which receives reflected scattered light alternately from the "standard" surface and the said material, phase sensing means which relates the parts of the photocell output to the respective reflecting surfaces, and means controlled by the output of the photocell and the phase sensing means to effect an indication of a difference in the relative values of the reflected light.

Preferably the means for effecting an indication of the difference in the related values of the reflected light comprises a shutter element arranged in the path of one of the two separate light beams and adjustable so as to mask that light beam to a variable extent, and motor means arranged to adjust said shutter element and to be controlled in accordance with the output of the photocell and of the phase sensing means so that the motor means moves the shutter element in a direction which tends to restore equality in the light received from the two reflecting surfaces, there being an indicator and/or recorder means in association with the shutter element to indicate and/or record the movement and position thereof.

Preferably the shutter is positioned in the path of the light beam between the material in the sample holder and the photocell.

In the case in which the material to be monitored is substantially white, such as wheat flour, starch, salt, hydrated lime or the like, the light from the source has filtered therefrom a high proportion of the infra-red rays before passing to the beam deflecting means, and a light filter means having its main transmission in the 525-625 millimicron wave band and positioned in front of the photocell in the path of reflected light from both reflecting surfaces.

An embodiment of the invention will now be described, by way of example, with reference to the accompanying drawing, in which:

FIGURE 1 is a sectional view through a sample holder, and

FIGURE 2 is a schematic view of the embodiment.

The sample holder 1 is in the form of a branch from a main trunk 2 along which the mass of material 3 is conveyed. At the inlet 4 of the sample holder 1 there is a continuously driven auger feeder element 5 arranged so that it will continuously collect material from the mass thereof and pass it into the body of the sample holder a portion of one wall of which is furnished with a window 6 across which the collected material is caused to pass. The outlet from the sample holder is furnished with a valve 7 which is adjustably biased by a counterweight 8 towards its closed position in such a manner that as a result of the related actions of the auger feeder 5 and the counterweight 8, the material passing through the sample holder is continuously maintained in a uniform state of consolidation.

Referring to FIGURE 2, the beam deflecting means is a tilted mirror 9 situated in the path of the light beam 10 projected by a lens system 11, filter 28 and a lamp and reflector 12, which mirror 9 is rotated by a motor 13 to cause the beam to be deflected alternately to the sample holder 1 and a "standard" surface 14 at a frequency in the range between 650 and 1100 cycles per minute.

The intermittent beams 15 and 16 of scattered light from the sample holder 1 and the "standard" surface 14 respectively pass through a light filter 17 having its main transmission in wave band 525-625 millimicrons to a photocell 18 connected to an amplifier 19, the output of which is an alternating signal corresponding to the differences in the values of the reflected light and is fed to a motor controller 20.

A phase sensing means 21 such as a switch or other electric current modifying element, is actuated by the beam deflecting motor 13 and the output therefrom is fed to the motor controller 20 so that the voltage variations from the amplifier 19 are related to each respective reflecting surface.

The controller 20 controls a motor 22 which moves a shutter 23 in the path 15 of the light reflected from the material, and also drives an indicating pointer 24 to show the amount by which the shutter 23 is moved from its mean position, such indication affording a means for assessing the magnitude of a change in the purity or granularity of the material in the path of the beam.

Signal means in the form of switches 25 are provided at predetermined extremities of a range of movement of the shutter 23 to give visible and/or audible indication if the monitored characteristics of a material pass out of an acceptable range.

The motor 22 is coupled to a recording apparatus 26 arranged so as automatically to provide a continuous record of movements of the shutter 23 and consequently to afford a record of all variations in the purity or granularity of the material being monitored.

In operation, material is trapped in the sample holder 1 until a required condition of consolidation is achieved, and thereafter the output valve 7 of the sample holder opens automatically to allow material to discharge at the input rate, the said material passing across the window 6 in the wall of the sample holder 1 as a uniformly consolidated column. Light from the source 12 passes through a filter 28 to reduce its infra-red content and is beamed by the lens system 11 so that it falls directly on the mirror 9 which causes the light to be directed alternately and at a required frequency on to the "standard" surface 14 and the surface formed by the material passing over the window 6 of the sample holder 1. Scattered light reflected from these surfaces falls on to the photocell 18 after passing through the filter 17 having its maximum transmission in the 525-625 millimicron wave band, such filter ensuring that the light which is transmitted to the photocell is not affected by the degree of natural or artificial bleaching which has been applied to the material.

Where the value of the scattered light reflected by one of the surfaces differs from the value of the scattered light reflected by the other surface, the output voltage of the photocell 18 will rise and fall by an amount related to the difference in light values and at the frequency determined by the movement of the mirror 9. The electrical output of the photocell 18 is fed to the amplifier 19 wherein alternating voltage values in the photocell circuit produce relatively equivalent variations in the power output of the amplifier 19, which power output causes the shutter operating motor 22 to be driven in a direction dictated by the phase sensing means 21; this latter being arranged so that by detecting which of the surfaces reflects the larger amount of light and is thus responsible for the higher voltage component affecting the photocell circuit, automatically adjusts the controls of the shutter driving motor 22 so that the shutter 23 is moved towards a position where the light values from both reflecting surfaces will be equal. When such a state of equality has been reached the voltage of the photocell circuit will be constant and therefore the shutter motor 22 will stop, and its associated indicating pointer 24 will show the amount by which the shutter 23 has been moved from its mean position, such indication affording a measure of a change which has occurred in the nature of the material. A manually-operable shutter 27 is provided in the path 16 between the "standard" surface and the photocell 18 and is arranged to mask the beam to an extent as will make the reflected light from the two surfaces equal when the motor driven shutter 23 is in its mean position.

The apparatus of the invention will thus provide an indication of any change in the purity or granularity of a parent material, or in the purity of a material of substantially constant granularity, or in the granularity of a material of substantially constant purity.

What we claim is:

1. Apparatus for the automatic continuous monitoring of the quality of dry particulate material comprising a sample holder, a transparent window in the sample holder, means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the single beam of light alternately from the standard surface and the material, phase sensing means which relates the parts of the photocell output to the respective reflecting surfaces, and means controlled by the output of the photocell and the phase sensing means to effect an indication of a difference in the relative values of the reflected light.

2. Apparatus for the automatic continuous monitoring of the quality of dry particulate material comprising a sample holder, a transparent window in the sample holder, means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the sample beam of light alternately from the standard surface and the material, phase sensing means which relates the parts of the photocell output to the respective reflecting surfaces, and means controlled by the output of the photocell and the phase sensing means to effect an indication of a difference in the relative values of the reflected light, and comprising a shutter element arranged in the path of the light from one or other of the reflecting surfaces and adjustable so as to mask that light to a variable extent, motor means for adjusting said shutter element and controlled in accordance with the output of the photocell and of the phase sensing means to move the shutter element in a direction which tends to restore equality in the light received from the two reflecting surfaces, and indicator means operatively associated with the shutter element to indicate the movement and position thereof.

3. Apparatus for the automatic continuous monitoring of the quality of dry particulate material comprising a sample holder, a transparent window in the sample holder, means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the single beam of light alternately from the standard surface and the material, phase sensing means which relates the parts of the photocell output to the respective reflecting surfaces, and means controlled by the output of the photocell and the phase sensing means to effect an indication of a difference in the relative values of the reflected light, and comprising a shutter element positioned in the path of the reflected light between the material in the sample holder and the photocell, and adjustable so as to mask that light to a variable extent, motor means for adjusting said shutter element and controlled in accordance with the output of the photocell and of the phase sensing means to move the shutter element in a direction which tends to restore equality in the light received from the two reflecting surfaces, and indicator means operatively associated with the shutter element to indicate the movement and position thereof.

4. Apparatus for the automatic continuous monitoring of the quality of dry particulate material comprising a sample holder, a transparent window in the sample holder, means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the single beam of light alternately from the standard surface and the material, phase sensing means which relates the parts of the photocell output to the respective reflecting surfaces, means controlled by the output of the photocell and the phase sensing means to effect an indication of a difference in the relative values of the reflected light, and comprising a shutter element positioned in the path of the reflected light between the material in the sample holder and the photocell, and adjustable so as to mask that light to a variable extent, motor means for adjusting said shutter element and controlled in accordance with the output of the photocell and of the phase sensing means to move the shutter element in a direction which tends to restore equality in the light received from the two reflecting surfaces, and indicator means operatively associated with the shutter element to indicate the movement and position thereof, and a manually-operable shutter positioned in the path of the reflected light between the standard surface and the photocell to permit initial setting of the apparatus.

5. Apparatus for the automatic continuous monitoring of the quality of dry particulate material comprising a sample holder, a transparent window in the sample holder, means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the single beam of light alternately from the standard surface and the material, means for filtering from the light from the source a high proportion of the infra-red rays before it passes to the beam deflecting means, a light filter means having its main transmission in the 525–625 millimicron wave band and positioned in front of the photocell in the path of the scattered light from both reflecting surfaces; phase sensing means which relates the parts of the photocell output to the respective reflecting surfaces, and means controlled by the output of the photocell and the phase sensing means to effect an indication of a difference in the relative values of the reflected light.

6. Apparatus for the automatic continuous monitoring of the quality of dry particulate material comprising a sample holder, a transparent window in the sample holder, means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the single beam of light alternately from the standard surface and the material, phase sensing means which relates the parts of the photocell output to the respective reflecting surfaces and comprising electric current modifying means mechanically coupled to the beam deflecting means, and means controlled by the output of the photocell and the phase sensing means to effect an indication of a difference in the relative values of the reflected light, and comprising a shutter element arranged in the path of the light reflected from one or other of the reflecting surfaces and adjustable so as to mask that light to a variable extent, motor means for adjusting said shutter element and controlled in accordance with the output of the photocell and of the phase sensing means to move the shutter element in a direction which tends to restore equality in the light received from the two reflecting surfaces, and indicator means operatively associated with the shutter element to indicate the movement and position thereof.

7. Apparatus for the automatic continuous monitoring of the quality of dry particulate material comprising a sample holder, a transparent window in the sample holder means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the single beam of light alternately from the standard surface and the material, phase sensing means which relates the parts of the photocell output to the respective reflecting surfaces, means controlled by the output of the photocell and the phase sensing means to effect an indication of a difference in the relative values of the reflected light, and comprising a shutter element arranged in the path of the light reflected from one or other of the reflecting surfaces and adjustable so as to mask that light to a variable extent, motor means for adjusting said shutter element and controlled in accordance with the output of the photocell and of the phase sensing means to move the shutter element in a direction which tends to restore equality in the light received from the two reflecting surfaces, and indicator means operatively associated with the shutter element to indicate the movement and position thereof, and signal means associated with the shutter element so as to be actuated by movement of the shutter element to extremities of a predetermined range.

8. Apparatus for the automatic continuous monitoring of the quality of dry particulate material comprising a sample holder, a transparent window in the sample holder, means leading to the sample holder for continuously collecting particulate material from a supply thereof, operable valve means co-acting with the collecting means to consolidate the collected material to a predetermined uniform density so that it passes without consequent change in granularity across the transparent window, a reflecting surface of a characteristic approved as a standard for comparison, a light source consisting of a single light beam, a rotating beam deflecting means consisting of motor-driven mirror disposed to receive light from the light source and operable to project that light alternately on to the standard surface and, through the transparent window, on to the material in the sample holder, a common photocell which receives a scattered reflection of the light of the single beam of light alternately from the standard surface and the material, means for filtering from the light from the source a high proportion of the infra-red rays before it passes to the beam deflecting means, a light filter means having its main transmission in the 525–625 millimicron wave band and positioned in front of the photocell in the path of the scattered light from both reflecting surfaces, phase sensing means which relates the parts of the photocell output to the respective reflecting surfaces, and means controlled by the output of the photocell and the phase sensing means to effect an indication of a difference in the relative values of the reflected light.

9. Apparatus for the automatic continuous monitoring of the quality of dry particulate material comprising a main trunk along which the material flows gravitationally, a sample holder constituted by a branch of the main trunk, a transparent window in the sample holder, an auger feeder element leading to the sample holder and arranged to pass material into the sample holder and across the window therein, and a valve at the outlet of the sample holder and which is sensitive to the pressure of consolidation of the material in the sample holder, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in the sample holder, a common photocell which receives a scattered reflection of the light of the single beam of light alternately from the standard surface and the material, phase sensing means which relates the parts of the photocell output to the respective reflecting surfaces, and means controlled by the output of the photocell and the phase sensing means to effect an indication of a difference in the relative values of the reflected light.

10. Apparatus for the automatic continuous monitoring of the quality of dry particulate material comprising a main trunk along which the material flows gravitationally, a sample holder constituted by a branch of the main trunk, a transparent window in the sample holder and auger feeder element leading to the sample holder and arranged to pass material into the sample holder and across the window therein, and a counterbalanced flap valve at the outlet of the sample holder and which is sensitive to the pressure of consolidation of the material in the sample holder, a reflecting surface of a characteristic approved as a standard for comparison, a light source consisting of a single light beam, a rotating beam deflecting means disposed to receive light from the light source and operable to project that light alternately on to the standard surface and, through the transparent window, on to the material in a sample holder, a common photocell which receives a scattered reflection of the light of the single beam of light alternately from the standard surface and the material, phase sensing means which relates the parts of the photocell output to the respective reflecting surfaces, and means controlled by the output of the photocell and the phase sensing means to effect an indication of a difference in the relative values of the reflected light.

References Cited

UNITED STATES PATENTS

| | | | |
|---|---|---|---|
| 35,606 | 6/1862 | Hatfield | 137—527.8 |
| 1,799,134 | 3/1931 | Hardy | 88—14 |
| 2,547,212 | 4/1951 | Jamison et al. | 250—218 X |
| 2,604,810 | 7/1952 | Backhouse | 88—14 |
| 3,104,020 | 9/1963 | Klapp | 214—17 |

FOREIGN PATENTS

| | | |
|---|---|---|
| 124,165 | 11/1959 | Russia. |

OTHER REFERENCES

Abstracts Journal #21/22 1959, Pergamon Press, page 1274, Compiled in U.S.S.R. Patents and Inventions No. 13–24, 1959.

RALPH G. NILSON, *Primary Examiner.*

WALTER STOLWEIN, *Examiner.*

M. A. LEAVITT, *Assistant Examiner.*